Dec. 31, 1935.　　　　J. E. RHODES　　　　2,025,899
COMBINED ELECTRIC BROILER AND HEATER
Filed Feb. 26, 1935
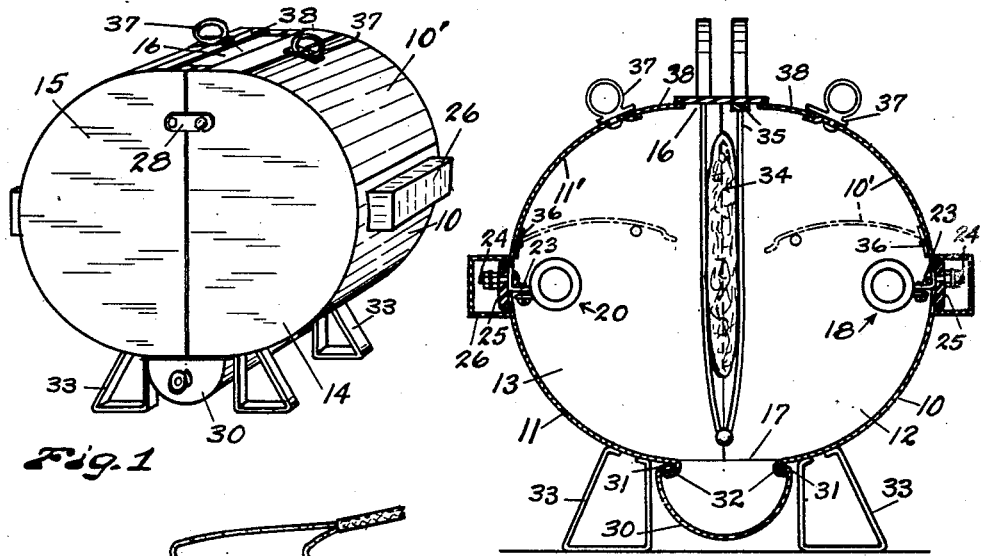
Fig. 1
Fig. 2
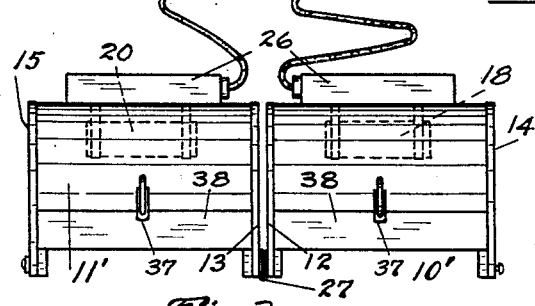
Fig. 3
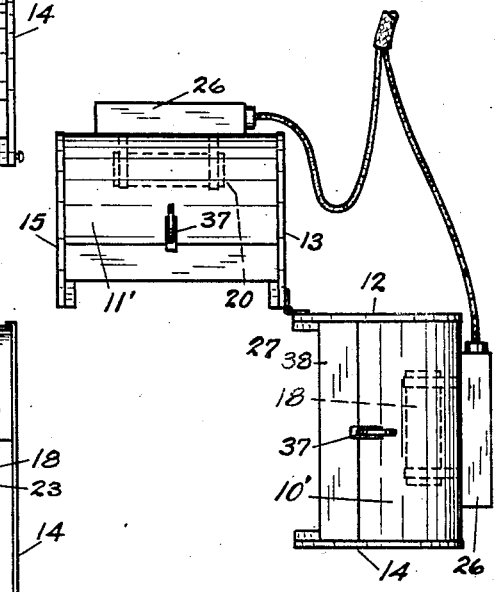
Fig. 4
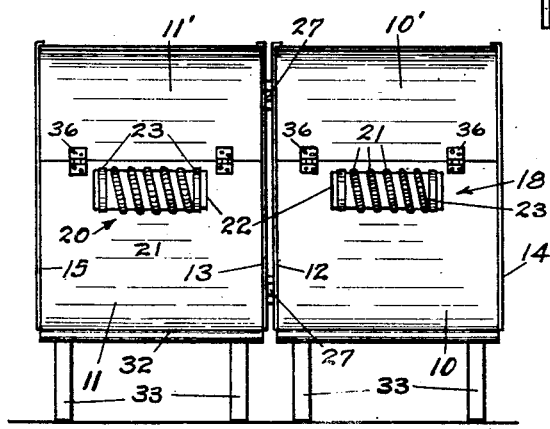
Fig. 5
INVENTOR
John E. Rhodes
BY Fred C. Matheny
ATTORNEY Patented Dec. 31, 1935

2,025,899

UNITED STATES PATENT OFFICE 2,025,899

COMBINED ELECTRIC BROILER AND HEATER

John E. Rhodes, Seattle, Wash.

Application February 26, 1935, Serial No. 8,281

3 Claims. (Cl. 219—34)

This invention relates to a combined electric broiler and heater and the present invention is in the nature of an improvement on the electric cooker disclosed in my patent application, Serial Number 753,870, filed Nov. 20, 1934.

A primary object of this invention is to provide an electric appliance of the heat reflector type which is quickly and easily convertible at will either into an electric broiler or into a reflector type electric heater.

Another object of this invention is to provide a combined electric broiler and heater in which the housing of the device forms the heat reflector means and in which the upper portion of each half of said housing is hinged to the lower portion thereof and forms an adjustable reflector section by which the heat from a heating element may be reflected downwardly.

Another object of the invention is to provide a combined electric broiler and heater comprising two concave semi-cylindrical housing and reflector sections hinged together in such a manner that they may be closed in face to face opposed relation to direct heat onto a single object to be broiled or opened a part to direct heat outwardly into a room at any desired angular position.

Another object of this invention is to provide a combined electric heater and broiler adapted for broiling meat or like juicy food in an upright position with a minimum loss of juice from said food said broiler searing the lower portion of the upright piece of food quickly to seal in the juices and then cooking the upper portion of said piece of food, all as more fully described in my prior patent application hereinbefore identified.

Another object of the invention is to provide a combined electric heater and broiler which is simple and inexpensive in construction, efficient in operation, both as a broiler and as a heater, and quickly and easily changed from a broiler to a room heater or vice versa.

Other and more specific objects will be apparent from the following description taken in connection with the accompanying drawing.

In the drawing Figure 1 is a view in perspective of a combined electric broiler and heater constructed in accordance with my invention, showing the same as it may appear when adjusted for use as a broiler.

Fig. 2 is a view in cross section of the same showing an article to be broiled operatively supported by a grill in a broiling position in the broiler.

Figs. 3 and 4 are plan views of this combined room heater and broiler showing the same in two different positions into which it may be adjusted or opened out for use as a room heater.

Fig. 5 is a front elevation of the device as it may appear when opened out into the same position as shown in Fig. 3 to operate as a room heater.

Like reference numerals designate like parts throughout the several views.

Referring to the drawing, 10—10' and 11—11' designate two semicylindrical reflector members which also serve as housing parts. The lower sections 10 and 11 of the reflector members are relatively fixed while the upper sections 10' and 11' are adjustable into different angular positions. The fixed reflector sections 10 and 11 are provided with rigidly connected end portions 12, 13, 14 and 15 which form closure means at the ends of the two halves of the combined room heater and cooker. These end members extend beyond the forward edges of the reflector members so that when the two halves of the device are positioned together in face to face relation with the end members abutting against each other, as shown in Figs. 1 and 2, an opening 16 will be left at the top and another opening 17 will be left at the bottom between the forward edges of the reflector members. Electric heating elements 18 and 20 are provided in the reflectors 10 and 11 respectively. These heating elements 18 and 20 are positioned substantially mid way between the tops and bottoms of the reflectors relatively close to the heat reflecting surfaces. These electric heating elements 18 and 20 may each comprise the usual high resistance wire 21 wound on an insulating core 22. Metal strap means 23 may extend around the cores 22 and be secured as by bolts 24 to a plate 25 of insulating material positioned externally of the heat reflectors. The metal strap means 23 are electrically connected with the high resistance wires 21 and serve both as binding posts and mechanical supports for the electric heating elements. Housings 26 are provided over the insulating plates and electrical connections on the exterior of the reflectors. Circuit wires extend into said housings 26 and connect with the metal strap binding post means 23.

The end walls 12 and 13 of the semi-cylindrical heater sections are hinged together by hinges 27. Readily releasable latch means 28 is provided for releasably securing the other two end walls 14 and 15 together. The latch means 28 is preferably positioned near the top of the heater, as shown in Fig. 1, and a drip pan 30, having inwardly bent edges 31 cooperating with reversely bent portions 32 of the reflectors 10 and 11 serves as a releasable means for securing the two halves of the heater together at the bottom.

Two leg members 33 are provided on the lower side of each reflector member. These leg members 33 are shaped and positioned so that they will form a substantial support for the two halves of the heater irrespective of the adjusted position of said two halves.

When the device is to be used for broiling, barbecuing or cooking, the two halves thereof are positioned in opposed face to face relation, the latch means 28 is fastened and the drip pan 30 is engaged with the curved edge portions 32 as shown in Fig. 2. The piece of food or article 34 to be broiled is placed between the two sides of a two part grill 35 and inserted through the top opening 16. The current is then turned on to energize the heaters and cook the article 34.

The heating elements 18 and 20 are positioned far enough away from the article 34 which is being cooked so that substantially none of the fats or juices which are thrown off by the food due to the action of the heat will come in contact with said heating elements. For this reason there will be very little deterioration of the heating elements as contrasted with the deterioration which occurs if the heating elements are placed relatively close to the food.

For the purpose of directing substantially all of the heat from the heating elements 18 and 20 onto the lower portion of the food at the beginning of the cooking or broiling operation I construct the reflectors 10—10' and 11—11' in two sections and connect the upper sections 10' and 11' with the lower sections 10 and 11 by hinges 36. Quickly releasable latch members 37 engaging fixed transverse bar portions 38 releasably secure the sections 10' and 11' in raised position so that they form parts of semi-cylindrical reflectors. When these portions 10' and 11' are lowered into the positions shown by dot and dash lines in Fig. 2, they will direct substantially all of the heat from the heating elements 18 and 20 onto the lower portion of the piece of food 34 which is supported in an upright position between the spaced apart heating elements, thus quickly searing the lower portion of said piece of food on both sides and forming a seal so that the juice and liquid fat can not escape. As soon as the lower portion of the upright piece of food has been thus seared the deflector portions 10' and 11' are angularly moved upwardly until they coincide with the walls of the reflectors. When the deflector portions 10' and 11' are in the raised position indicated by dot and dash lines in Fig. 2 they will lie closely against the reflectors where they will form a part of the heat reflecting surfaces and cooperate in distributing and reflecting the heat from the heating elements evenly against the piece of food 34. As the cooking of the piece of food is continued the parts which are liquefied by the heat will tend to run down toward the lower portion thereof but will be retained and prevented from escaping by the coating which has been formed by searing the exterior of the lower portion of said piece of food. Products of condensation and such liquids as are lost will be caught by the drip pan 20.

In cooking food in this device when it is adjusted to form a broiler the preferred method of operation is to place the food in the broiler, turn on the heat, position the deflector portions 10' and 11' in the lower heat deflecting position until the lower portion of the food is well seared on the outside, then move the heat deflector portions 10' and 11' upwardly into the raised position and allow the cooking of the food to continue with substantially evenly distributed heat.

The device is readily converted from a broiler or cooker into a heat reflector type room heater by removing the drip pan 30, unfastening the latch means 28, and angularly swinging the two halves of the device apart. These two hingedly connected halves may be opened out so that they are side by side, as shown in Figs. 3 and 5. In this position the heat will be directed outwardly from the two heating elements in substantially parallel directions. Also these two halves may be positioned at substantially right angles to each other, as shown in Fig. 4, or said two halves may be relatively positioned at substantially any other desired angle within 180° limits to secure any desired distribution of the heat.

The adjustable reflector sections 10' and 11' are useful in directing the heat downwardly and out over the floor on which the heater rests when the device is used as a room heater. The hinges 36 provide enough friction to hold the sections 10' and 11' in any adjusted position in which they are placed. This makes it possible to direct the major portion of the heat at substantially any desired elevation.

The latch members 37 form convenient handles by which the device may be handled.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In a combined electric heater and cooker, two semi-cylindrical heat reflectors; each of said reflectors comprising a relatively fixed and nonadjustable lower heat reflecting section and an upper adjustable heat reflecting section hinged to the lower section; substantially semi-circular end walls secured to the ends of said heat reflectors providing two similar heater halves; heating elements operatively positioned in each of said heater halves adjacent the heat reflector means thereof; hinge means pivotally connecting the two end walls at one end of the heat reflectors providing relative angular adjustment of the two heater halves through an angle of substantially one hundred eighty degrees; and readily releasable means securing the two heater halves together in face to face relation.

2. In a combined electric room heater and cooker, two lower concave heat reflector sections each substantially the shape of one quarter of a hollow cylinder; two upper concave heat reflector sections each of substantially quarter cylinder shape hinged respectively to the upper edges of said lower heat reflector sections and adjustable angularly relative to said lower sections; substantially semi-circular end walls secured to said lower heat reflector sections and cooperating to provide two similar heater halves; heating elements operatively disposed in each of said heater halves adjacent the heat reflectors; hinge means pivotally connecting the two end walls at one end of the heat reflectors providing relative angular adjustment of the two heater halves through an angle of substantially one hundred eighty degrees; and readily releasable means securing the two heater halves together when they are positioned in face to face relation.

3. In a combined electric heater and cooker, two semicylindrical heat reflectors, substantially semicircular end walls secured to the ends of each of said reflectors providing two similar heater halves, said end walls extending beyond the open sides of the heat reflectors providing an opening at the top and another opening at the bottom when said two heater halves are placed together in face to face relation; electric heating element means in each of said heater halves adjacent the heat reflectors; hinge means pivotally connecting the two end walls at one end of said heater halves providing relative angular movement of said halves between a face to face and an open position; reversely and outwardly curved portions on said heat reflectors along the edges of said bottom opening; and a drip pan engaging said reversely curved portions securing said two heater halves together.

JOHN E. RHODES.